No. 746,668. Patented December 15, 1903.

UNITED STATES PATENT OFFICE.

FRANCIS J. BULASK, OF TOLEDO, OHIO.

ARTIFICIAL FUEL.

SPECIFICATION forming part of Letters Patent No. 746,668, dated December 15, 1903.

Application filed March 12, 1903. Serial No. 147,515. (No specimens.)

*To all whom it may concern:*

Be it known that I, FRANCIS J. BULASK, a citizen of the United States, residing at Toledo, in the county of Lucas and State of Ohio, have invented certain new and useful Improvements in Artificial Fuel, of which the following is a specification.

Artificial fuel in the form of briquets or lumps manufactured in accordance with this invention when burned cokes preliminary to passing into ashes, being free from clinkers and possessing such cohesive properties as not to become disintegrated.

The combustible material of any nature, as coal-slack, sawdust, nut-shells, sugar-beet pulp, cornstalks, buckwheat-straw, marsh-weed, garbage, and like vegetable and refuse matter, is comminuted and to about one ton of two thousand pounds is added about ten pounds of sodium chlorid, the mass being combined with a binder and pressed into the required shape and allowed to set and dry. The binder consists of rye-flour, preferably spoiled, thirty-six pounds; potash or soda, eighteen pounds, and water sufficient to make a thin or soft dough. This dough is combined with the combustible material in a mill or in any way to insure a thorough mixing of the materials, so that when pressed together the particles will adhere. A small quantity of alum is sometimes added to the binder; also, a small percentage of sulfuric acid to convert the flour into dextrine. To increase the solidity and hardness of the briquet, a quantity of plaster-of-paris, soaked in a saturated solution of alum, allowed to set, baked in an oven and ground to a powder, is mixed with the combustible material prior to adding same to the flour dough or binder.

When the combustible material consists of beet-pulp, fruit, sugar-cane, or other refuse containing saccharine matter, the latter is carbonized in the process of combustion, thereby adding to the efficiency of the composition as a fuel.

Having thus described the invention, what is claimed as new is—

1. In an artificial fuel, a binder for the combustible material, containing flour and a solution of potash or soda and plaster-of-paris soaked in a saturated solution of alum, allowed to harden, baked and ground, in sufficient quantity to make a thin dough, substantially as specified.

2. An artificial fuel, consisting of combustible material and sodium chlorid and a binder of thin dough, same consisting of flour and a solution of potash or soda and plaster-of-paris soaked in a saturated solution of alum, allowed to harden, baked and ground, in sufficient quantity to make a thin dough, substantially as set forth.

In testimony whereof I affix my signature in presence of two witnesses.

FRANCIS J. BULASK. [L. S.]

Witnesses:
J. S. WERTMAN,
ELLIS BARTHOLOMEW.